(12) United States Patent
Takeda et al.

(10) Patent No.: US 11,337,187 B2
(45) Date of Patent: *May 17, 2022

(54) TERMINAL AND RADIO COMMUNICATION METHOD

(71) Applicant: NTT DOCOMO, INC., Tokyo (JP)

(72) Inventors: Kazuki Takeda, Tokyo (JP); Tooru Uchino, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,039

(22) Filed: Jan. 25, 2019

(65) Prior Publication Data
US 2019/0159198 A1 May 23, 2019

Related U.S. Application Data

(63) Continuation of application No. 15/547,146, filed as application No. PCT/JP2016/052620 on Jan. 29, 2016, now abandoned.

(30) Foreign Application Priority Data

Jan. 29, 2015 (JP) ................................ 2015-016019

(51) Int. Cl.
*H04B 7/06* (2006.01)
*H04L 27/00* (2006.01)
(Continued)

(52) U.S. Cl.
CPC ....... *H04W 72/0413* (2013.01); *H04W 24/08* (2013.01); *H04W 24/10* (2013.01);
(Continued)

(58) Field of Classification Search
CPC ... H04W 72/04; H04W 24/10; H04W 52/146; H04B 7/0626; H04L 27/26; H04L 5/0057
(Continued)

(56) References Cited

U.S. PATENT DOCUMENTS 9,369,234 B2 6/2016 Damnjanovic et al.
2011/0141928 A1* 6/2011 Shin ...................... H04L 1/0028
370/252
(Continued)

FOREIGN PATENT DOCUMENTS

JP 2013542625 A 11/2013

OTHER PUBLICATIONS

International Search Report issued in PCT/JP2016/052620 dated Apr. 5, 2016 (1 page).
(Continued)

*Primary Examiner* — Asad M Nawaz
*Assistant Examiner* — Jason A Harley
(74) *Attorney, Agent, or Firm* — Osha Bergman Watanabe & Burton LLP

(57) ABSTRACT

A user terminal is disclosed that includes a receiver that receives a downlink signal using multiple cells and a transmitter that periodically transmits multiple channel state information using a predetermined transmission time unit length. The user terminal also includes a processor that controls transmission of the channel state information by configuring a transmission period and timing of the multiple channel state information per cell based on a notification from a higher layer.

4 Claims, 12 Drawing Sheets

(51) Int. Cl.
- H04W 88/02 (2009.01)
- H04W 72/04 (2009.01)
- H04W 72/12 (2009.01)
- H04W 24/10 (2009.01)
- H04W 28/06 (2009.01)
- H04W 24/08 (2009.01)
- H04W 72/08 (2009.01)

(52) U.S. Cl.
CPC .......... H04W 28/06 (2013.01); H04W 72/04 (2013.01); H04W 72/085 (2013.01)

(58) Field of Classification Search
USPC ......................................................... 370/252
See application file for complete search history.

(56) References Cited

U.S. PATENT DOCUMENTS

| | | | | |
|---|---|---|---|---|
| 2011/0249578 | A1* | 10/2011 | Nayeb Nazar | H04L 1/0027 370/252 |
| 2011/0299467 | A1 | 12/2011 | Kim et al. | |
| 2012/0257531 | A1* | 10/2012 | Ko | H04L 5/0053 370/252 |
| 2013/0083741 | A1* | 4/2013 | Larsson | H04W 52/48 370/329 |
| 2013/0121318 | A1* | 5/2013 | Zhang | H04L 1/0029 370/336 |
| 2014/0003385 | A1* | 1/2014 | Dinan | H04L 5/001 370/329 |
| 2014/0241295 | A1* | 8/2014 | Tang | H04W 72/0413 370/329 |
| 2014/0369294 | A1* | 12/2014 | Seo | H04L 27/2628 370/329 |
| 2015/0049689 | A1* | 2/2015 | Seo | H04L 5/0073 370/329 |
| 2016/0192350 | A1* | 6/2016 | Yi | H04L 5/0035 370/329 |

OTHER PUBLICATIONS

Written Opinion of the International Searching Authority issued in PCT/JP2016/052620 dated Apr. 5, 2016 (4 pages).

Nokia Corporation et al.; "New SI proposal: LTE Carrier Aggregation Enhancement Beyond 5 Carriers"; 3GPP TSG RAN Meeting #65, RP-141418; Edinburgh, UK; Sep. 9-12, 2014 (6 pages).

LG Electronics; "Multi-cell Periodic CSI Transmission"; 3GPP TSG RAN WG1 Meeting #69, R1-122269; Prague, Czech Republic; May 21-25, 2012 (4 pages).

3GPP TS 36.300 V8.5.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall Description; Stage 2 (Release 8)"; May 2008 (134 pages).

LG Electronics; "Multi-cell Periodic CSI Transmission"; 3GPP TSG RAN WG1 Meeting #70 R1-123500; Qingdao, China, Aug. 13-17, 2012 (4 pages).

Extended European Search Report issued in the counterpart European Patent Application No. 16743518.9, dated May 11, 2018 (11 pages).

Office Action issued in the counterpart Japanese Patent Application No. 2016-572174, dated Mar. 6, 2018 (5 pages).

Extended European Search Report issued in the counterpart European Patent Application No. 18209164.5, dated Feb. 5, 2019 (11 pages).

Office Action issued in counterpart European Patent Application No. 16743518.9, dated Aug. 1, 2019 (6 Pages).

* cited by examiner

Table 7.2.2-1A: Mapping of $I_{CQI/PMI}$ to $N_{pd}$ and $N_{OFFSET,CQI}$ for FDD or for FDD-TDD and primary cell frame structure type 1

| $I_{CQI/PMI}$ | Value of $N_{pd}$ | Value of $N_{OFFSET,CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} \leq 317$ | | Reserved |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ | | Reserved |

These cannot be used for 20 CCs or more (applies to rows with $N_{pd}$ values 32, 64, 128)

FIG. 2

TERMINAL AND RADIO COMMUNICATION METHOD

CROSS-REFERENCE TO RELATED APPLICATIONS

This application is a continuation application of U.S. application Ser. No. 15/547,146, filed on Jul. 28, 2017, which is a national phase application of PCT/JP2016/052620, filed on Jan. 29, 2016, which claims priority to Japanese Patent Application No. 2015-016019, filed on Jan. 29, 2015. The contents of these applications are hereby incorporated by reference in their entirety.

TECHNICAL FIELD

The present invention relates to a user terminal, radio base station, radio communication system, and radio communication method, which are applicable to the next-generation mobile communication system.

BACKGROUND ART

In UMTS (Universal Mobile Telecommunications System) networks, for the purpose of a higher data rate, smaller delay, and/or the like, Long Term Evolution (LTE) has been specified (Non-Patent Literature 1). Further, for the purpose of a wider band and higher speed than LTE, an LTE successor system called "LTE Advanced" (which is also referred to as "LTE-A") has been studied and specified as LTE Rel. 10/11.

The system band of LTE Rel. 10/11 includes at least one Component Carrier (CC) that is defined in units of the system band of an LTE system. Formation of a wider band by combining a plurality of CCs in this way is called "Carrier Aggregation" (CA). Further, in LTE Rel. 11, there has been introduced Multiple Timing Advances (MTA) that enables timing control to be performed differently among CCs. By introducing MTA, it becomes possible to realize CA with a plurality of CCs, which are formed at a plurality of transmission/reception points (for example, a radio base station and an RRH (Remote Radio Head)) arranged at substantially different positions.

Further, for LTE Rel. 12, which is an LTE successor system further succeeding, studies have been conducted on various scenarios of using a plurality of radio base stations in different frequency bands (carriers). For example, studies have been conducted such that CA utilizing MTA described above is applied in a case where a plurality of cells are formed of a single radio base station, and that Dual Connectivity (DC) is applied in a case where a plurality of cells are formed of radio base stations completely different from each other.

CITATION LIST

Non-Patent Literature

[Non-Patent Literature 1] 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In the case of CA for the LTE successor systems (LTE Rel. 10 to 12) described above, the number of CCs settable (configurable) per user terminal (UE: User Equipment) is limited to five at most. For LTE Rel. 13, which is an LTE successor system further succeeding, studies have been conducted to configure six or more CCs by relaxing the limit of the number of CCs settable per user terminal, in order to realize radio communication more flexibly and at a higher speed.

However, if the number of CCs settable to a user terminal is expanded to six or more (for example, 32), it is thought that a transmission method for the existing (legacy) systems (Rel. 10 to 12) becomes difficult to apply as it is. For example, in the existing systems, when a channel state is periodically reported from a user terminal, a so-called periodic CQI (P-CQI: Periodic-Channel Quality Indicator) is transmitted on an uplink control channel (PUCCH: Physical Uplink Control CHannel) by use of a format on the premise of five CCs or less. Accordingly, also where the number of CCs is set to be six or more, it is expected that a transmission technique for realizing an adequate channel state report is required.

The present invention was made in view of such a respect, and it is an object of the invention to provide a user terminal, radio base station, radio communication system, and radio communication method that enable a channel state to be adequately reported even where the number of component carriers settable to a user terminal is expanded to six or more.

Solution to Problem

One aspect of a user terminal of the present invention is a user terminal for communicating with a radio base station by use of six or more component carriers. The user terminal comprises a measuring section configured to measure reception quality of a downlink channel of each of the component carriers, and a transmission section configured to periodically transmit information relating to the reception quality in accordance with timing specified from the radio base station. The transmission section transmits information relating to reception quality of a plurality of component carriers, at a same subframe, by use of PUSCH or a PUCCH format having a larger capacity as compared with a PUCCH format for existing systems in which a number of configured component carriers is five or less.

Advantageous Effects of Invention

According to the present invention, it is possible to adequately report a channel state even where the number of component carriers settable to a user terminal is expanded to six or more.

BRIEF DESCRIPTION OF DRAWINGS

FIG. 2 is a diagram illustrating a table that prescribes existing P-CQI reporting periods;

DESCRIPTION OF EMBODIMENTS

Figure 1:
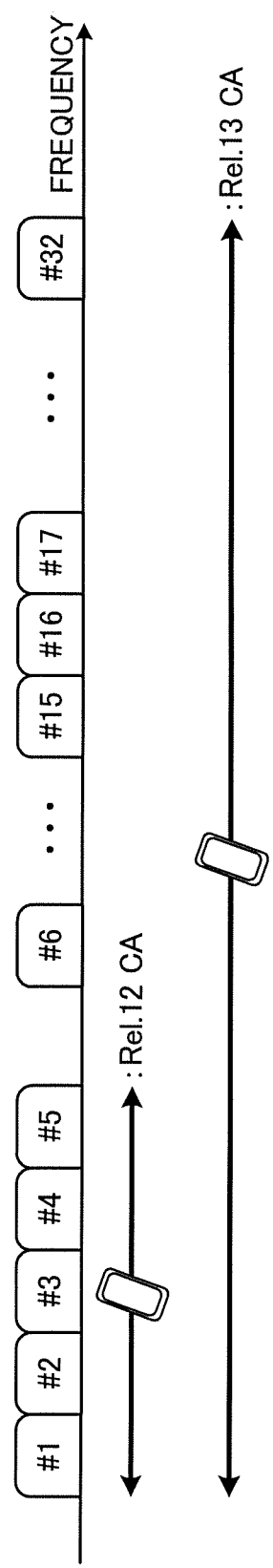
FIG. 1 is a diagram for explaining existing carrier aggregation and carrier aggregation expanded therefrom.

FIG. 1 is an explanation diagram of carrier aggregation (CA) in an LTE successor system (LTE Rel. 12), and of CCs of CA being studied in LTE Rel. 13. As illustrated in FIG. 1, in the case of LTE Rel. 12, at most five CCs (CC #1 to CC #5) are set per user terminal, but, in the case of LTE Rel. 13, expanded carrier aggregation (CA enhancement) for setting six or more CCs (cells) has been studied. For the expanded CA, as illustrated in FIG. 1, studies have been conducted such that at most 32 CCs (CC #1 to CC #32) are configured (set) per user terminal. In this case, communication can be performed with respect to a user terminal by use of a bandwidth of at most 640 MHz. Consequently, for example, it is possible to increase or change the number of CCs to be used for communication, and thereby to realize radio communication flexibly and at a high speed.

Further, for LTEs since Rel. 13, studies have been conducted by also targeting an operation in a frequency band that requires no license, i.e., in an unlicensed band. As the unlicensed band, for example, 2.4 GHz-band or 5 GHz-band is used as in Wi-Fi. In LTE Rel. 13, a study target is carrier aggregation between a licensed band and an unlicensed band (LAA: License-Assisted Access), and studies have been conducted also on CA combining a licensed band of 100 MHz and an unlicensed band of 300 MHz, for example.

On the other hand, as described above, in the existing systems, P-CQIs are transmitted on an uplink control channel (PUCCH) by use of a format on the premise of five CCs or less. Such P-CQIs are calculated individually for the respective CCs in the user terminal, and are reported individually for the respective CCs (for example, by use of RRC or the like) to a radio base station, at a period set by the radio base station. When the P-CQIs are to be transmitted, if there is no transmission data (if there is no PUSCH), the P-CQIs are transmitted in accordance with PUCCH format 2, and, if there is transmission data (if there is PUSCH), the P-CQIs are transmitted by use of PUSCH. However, P-CQIs of a plurality of CCs cannot be transmitted at the same subframe (the same TTI (Transmission Time Interval)) in one uplink CC. For example, if P-CQIs of a plurality of CCs overlap with each other at the same subframe, the user terminal reports only one P-CQI in accordance with a predetermined rule, and stops (drops) transmission of the other P-CQIs.

In a case where this P-CQI reporting technique for the existing systems is applied to the above-described CA that has been studied for LTE Rel. 13, only a P-CQI of one CC is reported at one subframe (one TTI). Accordingly, it takes time to report P-CQIs of all the CCs, and thus the P-CQI reporting period corresponding to each of the CCs ends up being prolonged. For example, in the case of CA using 32 CCs, even if all the uplink subframes are used to transmit the P-CQIs, the shortest period becomes 32 ms. In general, the radio base station side is desired to timely acquire the CQIs of the user terminal, and so it is not preferable to prolong the P-CQI reporting period for each CC.

FIG. 2 illustrates a table example that prescribes P-CQI reporting periods in an existing system. There are prescribed 2, 5, 10, and 20 for periods $N_{pd}$, but these periods cannot be adopted in CA with 20 CCs or more.

The inventors of the present invention paid attention to these features of CA, and have arrived at the concept that P-CQIs of a plurality of CCs are transmitted at the same subframe by use of PUSCH or a PUCCH format (which will be referred to as "high capacity PUCCH format", hereinafter) having a larger capacity as compared with a PUCCH format for the existing (legacy) systems in which the number of configured CCs is five or less.

Next, an embodiment will be described below in detail. In the following description, for the sake of convenience in description, an explanation will be given of a case where the number of CCs settable per user terminal is 32 in performing CA. However, in a radio communication system according to the embodiment, the number of CCs settable per user terminal is not limited thereto, but may be changed as needed.

First Example

In the first example, when P-CQI reporting is performed, the high capacity PUCCH format described above is used, and thereby P-CQIs corresponding to a plurality of CCs are transmitted at the same uplink subframe (the same TTI). In this example, an explanation will be given of a case where P-CQIs of eight CCs are transmitted at one subframe by use of the high capacity PUCCH format. However, the number of CCs to be transmitted by use of the high capacity PUCCH format is not limited thereto.

For each of the CCs, the period and timing for P-CQI reporting can be set in advance. For example, in the example illustrated in FIG. 3, as regards CCs #1 to #8, there is set a period of 20 ms together with timing for performing transmission at the initial subframe on the uplink illustrated in FIG. 3 (the first subframe from the left). As regards CCs #9 to #16, there is set a period of 20 ms together with timing for performing transmission at the second subframe on the uplink illustrated in FIG. 3 (the second subframe from the left). As regards CCs #17 to #24, there is set a period of 10 ms together with timing for performing transmission at the third subframe on the uplink illustrated in FIG. 3 (the third subframe from the left). As regards CCs #25 to #32, there is set a period of 10 ms together with timing for performing transmission at the fourth subframe on the uplink illustrated in FIG. 3 (the fourth subframe from the left).

Figure 3:
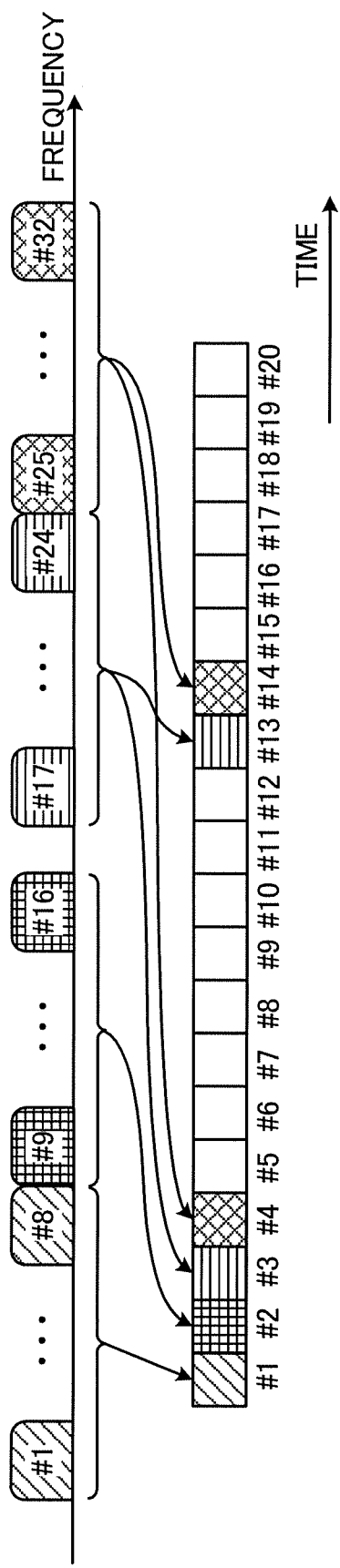
FIG. 3 is a diagram for explaining an example of P-CQI transmission according to a first example.

As a result, on the uplink, the first subframe illustrated in FIG. 3 is used to transmit a plurality of P-CQIs corresponding to the CCs #1 to #8, the second subframe is used to transmit a plurality of P-CQIs corresponding to the CCs #9 to #16, the third subframe is used to transmit a plurality of P-CQIs corresponding to the CCs #17 to #24, and the fourth subframe is used to transmit a plurality of P-CQIs corresponding to the CCs #25 to #32. Further, since the CCs #17 to #24 are set with a period of 10 ms, the 13th subframe on the uplink in FIG. 3 is also used to transmit their latest P-CQIs. Similarly, for the CCs #25 to #32, the 14th subframe is also used to transmit their latest P-CQIs.

For the control according to the first example, the high capacity PUCCH described above is set (configured) in the user terminal. Further, the period and timing for P-CQI reporting for each of the CCs are set (configured) from a radio base station by use of RRC or the like. The user terminal transmits P-CQIs of at most eight CCs, at the same subframe (the same TTI), by use of the high capacity PUCCH format, in accordance with the above period and timing.

In order to provide a new format (high capacity PUCCH format) applicable in this embodiment, for example, there may be considered a method of reducing the orthogonal spread block codes of PUCCH format 3. According to existing PUCCH format 3, the same bit sequence is copied to five or four time symbols, and the orthogonal spread codes are multiplied. Different orthogonal spread codes are multiplied for respective users, so that an orthogonal multiplex state is formed with respect to each other. For example, by setting the orthogonal code length to be "1", different information bit sequences can be applied to the five or four time symbols. However, in this case, the number of users that can be multiplexed onto the same PRB is reduced. For example, where the orthogonal code length is "1", the transmittable bit sequence length becomes five times or four times existing PUCCH format 3, but the number of users that can be multiplexed becomes one.

As the new format (high capacity PUCCH format), there may be also considered to define a PUCCH format using frequency resources of two PRBs or more. For example, if a PUCCH format for performing transmission by two PRBs is defined based on the configuration of existing PUCCH format 3, it becomes possible to transmit bit sequences twice as large as existing PUCCH format 3. As regards which number of PRBs is used and which PRB is used for performing transmission: they may be determined by the UE in accordance with the number of bits of an HARQ-ACK or CSI (CQI or the like) to be multiplexed to PUCCH; they may be specified in advance by use of higher layer signaling, such as RRC; or they may be indicated by the base station for each subframe by use of a control signal, such as PDCCH.

Alternatively, as the high capacity PUCCH format, there may be also considered to define a PUCCH format using multilevel modulation of 16 QAM or more. For example, if a PUCCH format where Uplink Control Information (UCI) is modulated using 16 QAM is defined based on the configuration of existing PUCCH format 3, it becomes possible to transmit bit sequences twice as large as existing PUCCH format 3. As regards which modulation scheme is used: this may be determined by the UE in accordance with the number of bits of an HARQ-ACK or CSI to be multiplexed to PUCCH; this may be specified in advance by use of higher layer signaling, such as RRC; or this may be indicated by the base station for each subframe by use of a control signal, such as PDCCH.

In the explanation described above, "based on the configuration of existing PUCCH format 3" means to reuse: a coding method to UCI, such as an HARQ-ACK or CSI; an order of mapping to radio resources; the temporal symbol position of a reference signal contained in PUCCH format 3; and the like. As a reference signal sequence for generating the reference signal, it is assumed to use a sequence different from that with one PRB. For example, there may be considered to use a reference signal sequence to be multiplexed to PUSCH with two PRBs defined in the existing LTE.

Alternatively, PUSCH may be utilized as a new format where uplink control signals of six or more CCs can be multiplexed. In this case, even when the user terminal does not perform transmission of PUSCH, it performs transmission of uplink control signals by PUSCH.

In the existing systems, if UL data transmission and UCI transmission are generated at the same subframe, the user terminal applies a method of multiplexing the UCI in PUSCH indicated to perform the UL data transmission (Piggyback). Unlike PUCCH, PUSCH does not adopt a configuration to code-multiplex different users in the same PRB, and the number of information bits containable per PRB is larger. Accordingly, even if there is no UL data, an arrangement can be adopted to transmit the UCI through PUSCH, and thereby to consider this as the high capacity PUCCH format and to transmit the UCI.

The existing PUSCH is transmitted at a specific subframe and a specific PRB, based on PDCCH/EPDCCH from the base station (UL grant prescribed as the DCI format 0 or DCI format 4) or higher layer signaling. This can be changed to perform PUSCH transmission, for example, even if there is only transmission of an HARQ-ACK or CSI.

As regards a PRB or MCS allocated in a PUSCH configuration to transmit the UCI: this may be specified in advance by higher layer signaling, for example; or this may be decided based on PDCCH/EPDCCH indicating downlink data allocation (DL allocation prescribed as DCI format 1A or DCI format 2D) or information relating to PDSCH on which downlink data is to be transmitted. With this arrangement, there becomes no need to transmit PDCCH to specify a PRB that is used to transmit the high capacity PUCCH format of the PUSCH type, whereby the overhead of a control signal region can be reduced.

Further, conventionally, when having transmitted PUSCH containing UL data, the user terminal receives PHICH corresponding to PUSCH, and determines whether or not to perform retransmission. On the other hand, an HARQ is not applied to PUCCH on which an HARQ-ACK or CSI is to be transmitted. Accordingly, there may be adopted an arrangement such that, when transmitting PUSCH to be used as the high capacity PUCCH format (i.e., it does not contain UL data but contains only UCI), the user terminal does not need to perform reception and detection of PHICH corresponding to PUSCH. With this arrangement, since the user terminal does not need to perform unnecessary PHICH reception, the processing burden of the user terminal can be reduced.

Alternatively, there may be adopted an arrangement such that, when transmitting PUSCH to be used as the high capacity PUCCH format (i.e., it does not contain UL data but contains only UCI), the user terminal performs reception and detection of PHICH corresponding to PUSCH. PUSCH that does not perform code spreading requires higher reception quality (Signal to Interference plus Noise power Ratio: SINR) as compared with PUCCH. In this way, if PUSCH containing only UCI is treated by giving notice of a detection result by PHICH and thereby applying an HARQ, it becomes possible for the base station to reliably receive a control signal with high quality.

As described above, according to the first example, it is possible to adequately report a channel state even where the number of component carriers settable to the user terminal is expanded to six or more. Further, it is possible to cope with such a demand that particularly the radio base station side is desired to timely acquire the CQIs of the user terminal.

It should be noted that, in the first example, the period and timing for P-CQI reporting are set to each CC, but the period and timing for P-CQI reporting may be set to each CC group including a plurality of CCs, which is set in advance. For example, in the CCs illustrated in FIG. 3, the CCs #1 to #8, the CCs #9 to #16, the CCs #17 to #24, and the CCs #25 to #32 may be sorted into respective CC groups so that the period and timing can be set to each of the CC groups.

Second Example

In the second example, similarly to the first example, when P-CQI reporting is performed, the high capacity PUCCH format described above is used. However, with respect to each CC, an uplink CC (cell), such as a CC to be used for P-CQI reporting, can be set (configured), in addition to the period and timing for P-CQI reporting.

Figure 4:
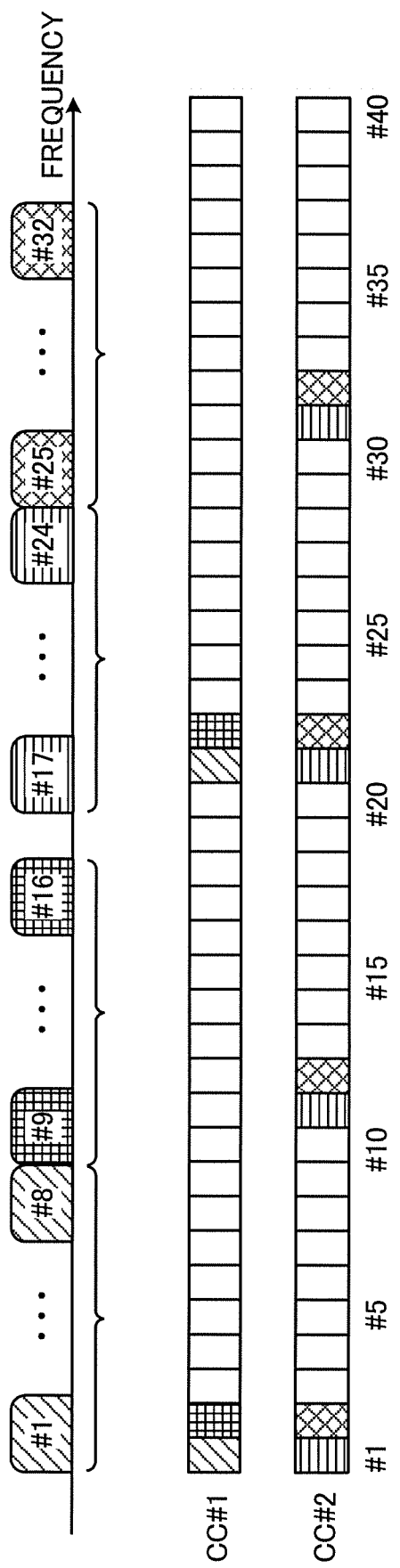
FIG. 4 is a diagram for explaining an example of P-CQI transmission according to a second example.

In the example illustrated in FIG. 4, as regards CCs #1 to #8, in addition to a period of 20 ms together with timing for performing transmission at the initial subframe on the uplink illustrated in FIG. 4 (the first subframe from the left), there is set use of the CC #1 on the uplink. As regards CCs #9 to #16, in addition to a period of 20 ms together with timing for performing transmission at the second subframe on the uplink illustrated in FIG. 4 (the second subframe from the left), there is set use of the CC #1 on the uplink. As regards CCs #17 to #24, in addition to a period of 10 ms together with timing for performing transmission at the first subframe on the uplink illustrated in FIG. 4 (the first subframe from the left), there is set use of the CC #2 on the uplink. As regards CCs #25 to #32, in addition to a period of 10 ms together with timing for performing transmission at the second subframe on the uplink illustrated in FIG. 4 (the second subframe from the left), there is set use of the CC #2 on the uplink.

FIG. 4 illustrates a case where the number of CCs set on the uplink is two, but this is not limiting. Further, one of a plurality of CCs set here may be the PCell.

As a result, as illustrated in FIG. 4, in the CC #1 on the uplink, the first subframe is used to transmit a plurality of P-CQIs corresponding to the CCs #1 to #8, and the second subframe is used to transmit a plurality of P-CQIs corresponding to the CCs #9 to #16. Further, since the CCs #1 to #8 and the CCs #9 to #16 are set with a period of 20 ms, in the CC #1 on the uplink, the 21st subframe is used to transmit the latest plurality of P-CQIs corresponding to the CCs #1 to #8, and the 22nd subframe is used to transmit the latest plurality of P-CQIs corresponding to the CCs #9 to #16.

Further, in the CC #2 on the uplink, the first subframe is used to transmit a plurality of P-CQIs corresponding to the CCs #17 to #24, and the second subframe is used to transmit a plurality of P-CQIs corresponding to the CCs #25 to #32. Further, since the CCs #17 to #24 and the CCs #25 to #32 are set with a period of 10 ms, in the CC #2 on the uplink, each of the 11th, 21st, and 31st subframes is used to transmit the latest plurality of P-CQIs corresponding to the CCs #17 to #24, and each of the 12th, 22nd, and 32nd subframes is used to transmit the latest plurality of P-CQIs corresponding to the CCs #25 to #32.

For the control according to the second example, the high capacity PUCCH described above is set in the user terminal. Further, the period and timing for P-CQI reporting for each of the CCs, and a CC in the uplink, are set from a radio base station by use of RRC or the like. The user terminal transmits P-CQIs of at most eight CCs, at the same subframe, by use of the high capacity PUCCH format, in accordance with the above period, timing, and uplink CC. Here, the user terminal in the second example is preferably formed of a user terminal that can perform UL CA. The user terminal to which the second example is applied is supposed to have reported the following terminal abilities to the base station in advance: It can perform UL CA at a specific frequency by itself, and, at this time, it can perform P-CQI feedback described in the second example.

According to the second example configured as described above, it is possible to adequately report a channel state even where the number of component carriers settable to the user terminal is expanded to six or more. Further, it is possible to cope with such a demand that particularly the radio base station side is desired to timely acquire the CQIs of the user terminal.

In addition, since P-CQI reporting is performed by use of a plurality of CCs on the uplink, it is possible to avoid performing P-CQI reporting intensively by a specific CC (for example, the CC #1 of the PCell). Further, in the example illustrated in FIG. 4, P-CQIs of at most 16 CCs can be transmitted at the same time by one TTI, and so it is possible to remarkably improve the P-CQI transmission amount per unit transmission time. Further, since the P-CQI transmission amount per unit transmission time is improved, it is possible to shorten the time necessary for P-CQI reporting in the user terminal. Further, if the capacity of the high capacity PUCCH format (for example, where the P-CQI information amount corresponding to one CC is assumed as a unit, the capacity is defined by the number of units) and/or the number of CCs set in the uplink are suitably changed, it is possible to perform P-CQI reporting flexibly in accordance with the P-CQI acquisition request.

Third Example

In the third example, similarly to the second example, P-CQI reporting can be performed by a plurality of CCs on the uplink, but control is conducted such that P-CQI reporting is performed by the CC #1 of the PCell, as far as possible. However, if the P-CQI reporting amount to be treated by the same subframe exceeds a predetermined amount, P-CQI reporting is performed by a plurality of CCs as in the second example. Accordingly, with respect to each CC, an arrangement can be adopted to set (configure) the period and timing for P-CQI reporting, without setting (configuring) a CC in the uplink.

Figure 5:
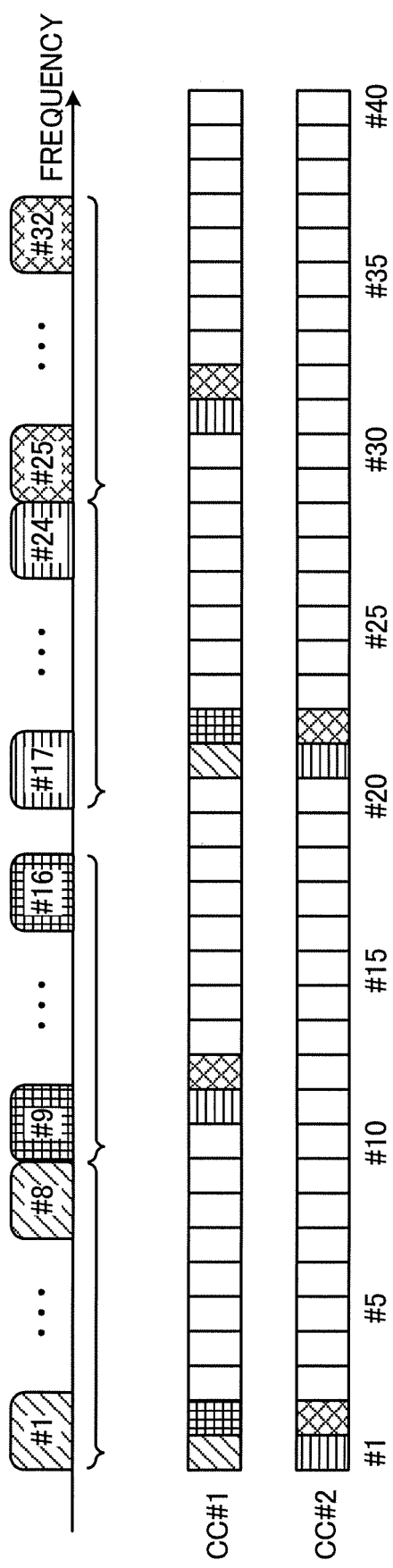
FIG. 5 is a diagram for explaining an example of P-CQI transmission according to a third example.

In the example illustrated in FIG. 5, as regards CCs #1 to #8, there is set a period of 20 ms together with timing for performing transmission at the initial subframe on the uplink illustrated in FIG. 5 (the first subframe from the left). As regards CCs #9 to #16, there is set a period of 20 ms together with timing for performing transmission at the second subframe on the uplink illustrated in FIG. 5 (the second subframe from the left). As regards CCs #17 to #24, there is set a period of 10 ms together with timing for performing transmission at the first subframe on the uplink illustrated in FIG. 5 (the first subframe from the left). As regards CCs #25 to #32, there is set a period of 10 ms together with timing for performing transmission at the second subframe on the uplink illustrated in FIG. 5 (the second subframe from the left).

In the user terminal, when P-CQIs of CCs set with the same timing are to be transmitted, it is determined whether the P-CQI transmission amount (or the number of CCs to be transmitted) exceeds a predetermined value. If the amount exceeds the predetermined value, the P-CQIs are dividedly allocated to the CC #1 of the PCell and the CC #2 of the SCell, and are thereby transmitted. For example, when a plurality of P-CQIs corresponding to the CCs #1 to #8 and the CCs #17 to #24 set with the first subframe for timing are to be transmitted, it is determined whether this amount exceeds the transmission amount of P-CQIs of eight CCs, which can be transmitted by use of the high capacity PUCCH format. Since the number of CCs set with the first subframe for timing is 16, it is determined that this amount exceeds the transmission amount of P-CQIs of eight CCs, and so the P-CQIs to be transmitted are dividedly allocated to the CC #1 of the PCell and the CC #2 of the SCell. As a result, as illustrated in FIG. 5, in the first subframe, P-CQIs corresponding to the CCs #1 to #8 are allocated to the CC #1, and P-CQIs corresponding to the CCs #17 to #24 are allocated to the CC #2.

Also in the second subframe, processing is performed similarly to the first subframe. As a result, as illustrated in FIG. 5, in the second subframe, P-CQIs corresponding to the CCs #9 to #16 are allocated to the CC #1, and P-CQIs corresponding to the CCs #25 to #32 are allocated to the CC #2. Similar processing is performed also at each of the 21st subframe and the 22nd subframe.

On the other hand, also in the 11th subframe, when a plurality of P-CQIs corresponding to the CCs #17 to #24 set with the 11th subframe for timing are to be transmitted, it is determined whether this amount exceeds the transmission amount of P-CQIs of eight CCs, which can be transmitted by use of the high capacity PUCCH format. Here, since the number of CCs is eight, it is determined that this amount does not exceed the transmission amount of P-CQIs of eight CCs, and so the P-CQIs to be transmitted are allocated to the CC #1 of the PCell. As a result, as illustrated in FIG. 5, at the 11th subframe, P-CQIs corresponding to the CCs #17 to #24 are allocated to the CC #1, and are thereby transmitted. Similar processing is performed also at each of the 12th subframe, the 31st subframe, and the 32nd subframe.

As a result of the above, as illustrated in FIG. 5, in the CC #1 on the uplink, each of the first subframe and the 21st subframe is used to transmit the latest plurality of P-CQIs corresponding to the CCs #1 to #8, and each of the second subframe and the 22nd subframe is used to transmit the latest plurality of P-CQIs corresponding to the CCs #9 to #16. Further, each of the 11th subframe and the 31st subframe is used to transmit the latest plurality of P-CQIs corresponding to the CCs #17 to #24, and each of the 12th subframe and the 32nd subframe is used to transmit the latest plurality of P-CQIs corresponding to the CCs #25 to #32.

On the other hand, in the CC #2 on the uplink, each of the first subframe and the 21st subframe is used to transmit the latest plurality of P-CQIs corresponding to the CCs #17 to #24, and each of the second subframe and the 22nd subframe is used to transmit the latest plurality of P-CQIs corresponding to the CCs #25 to #32

For the control according to the third example, the high capacity PUCCH described above is set in the user terminal. Further, the period and timing for P-CQI reporting for each of the CCs are set from a radio base station by use of RRC or the like. The user terminal performs the determination processing described above (determination as to whether to exceed the transmission amount of P-CQIs of eight CCs, which can be transmitted by use of the high capacity PUCCH format) in accordance with the above period and timing. If the transmission amount is exceeded, it ensures resources dividedly by the CC #1 of the PCell and the CC #2 of the SCell, and thereby transmits P-CQIs. Here, the user terminal in the third example is preferably formed of a user terminal that can perform UL CA. The user terminal to which the third example is applied is supposed to have reported the following terminal abilities to the base station in advance: It can perform UL CA at a specific frequency by itself, and, at this time, it can perform P-CQI feedback described in the second example.

According to the third example configured as described above, it is possible to adequately report a channel state even where the number of component carriers settable to the user terminal is expanded to six or more. Further, it is possible to cope with such a demand that particularly the radio base station side is desired to timely acquire the CQIs of the user terminal.

In addition, since the coverage of the PCell is usually better in the uplink, and this single CC (uplink cell) is used as far as possible to transmit P-CQIs, it is possible to suppress the battery consumption in the user terminal. Further, even if all the P-CQIs cannot be transmitted by the CC #1 of the PCell, it is possible to reduce P-CQIs to be stopped (or dropped) in transmission, and thereby to improve the channel follow-up performance. With respect to each CC, if an arrangement is adopted to set the period and timing for P-CQI reporting, without setting a CC in the uplink, it is possible to reduce the overhead of higher layer signaling by an amount corresponding to the setting of a CC, as compared with the second example.

(Modification of Third Example)

The third example described above determines as to whether to exceed the transmission amount of P-CQIs of eight CCs, which can be transmitted by use of the high capacity PUCCH format. If the transmission amount is exceeded, it ensures resources dividedly by the CC #1 of the PCell and the CC #2 of the SCell, and thereby transmits P-CQIs. However, some conditions may be added to execute such control.

For example, when the P-CQIs are dividedly allocated to the CC #1 of the PCell and the CC #2 of the SCell, the P-CQI of the PCell may be always allocated to the PCell. In general, since the CQI of the PCell is important to ensure the connection between the radio base station and the user terminal, if this is allocated to the PCell, the CQI of the PCell can be reliably received by the radio base station.

Further, in addition to this additional condition, allocation to the CC #1 of the PCell may be made in the ascending order of the cell index. In general, there are a lot of cases where information transmitted and received by a cell with a lower cell index is more important. Accordingly, the above arrangement enables the CQIs of CCs that receive more important information to be transmitted by the PCell having a better coverage.

Further, if the total amount of P-CQIs to be transmitted at one subframe exceeds the sum of the capacity of the CC #1 of the PCell and the capacity of the CC #2 of the SCell, transmission of surplus ones of the P-CQIs may be stopped in accordance with a predetermined condition. For example, in accordance with the priority determined in advance, transmission of P-CQIs may be stopped from one concerning information with lower priority. As a method of determining the priority, it may be determined to give higher priority to a lower cell index in order. In general, there are a lot of cases where information transmitted and received by a cell with a lower cell index is more important. Accordingly, the above arrangement enables the CQIs of CCs that receive more important information to be transmitted by the PCell having a better coverage.

Fourth Example

In the fourth example, when transmission of a P-CQI of a specific CC is performed, the P-CQI of a specific CC is transmitted by use of PUCCH format 2, 2a, or 2b (an existing transmission format). In the fourth example, the PUCCH format to be used is changed between transmission of the P-CQI of a specific CC and transmission of P-CQIs of the other CCs. Information relating to the specific CC can be set (configured) in the user terminal by use of higher layer signaling, such as RRC.

The fourth example can be applied to any one of the first to third examples described above. Here, with reference to FIG. 6, an explanation will be given of an example where a method of transmitting only a P-CQI of a specific CC by use of an existing PUCCH format is applied to the above third example.

Figure 6:
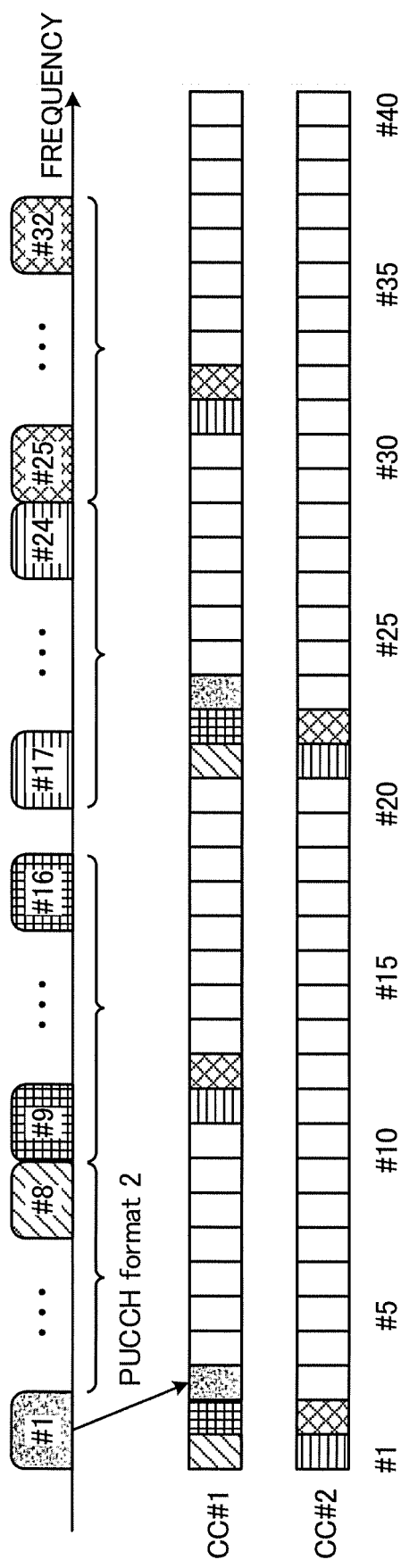
FIG. 6 is a diagram for explaining an example of P-CQI transmission according to a fourth example.

FIG. 6 illustrates a case where the specific CC is the CC #1. Further, as regards the CC #1 serving as the specific CC, there is set a period of 20 ms together with timing for performing transmission at the third subframe on the uplink illustrated in FIG. 6 (the third subframe from the left). Accordingly, the user terminal uses the third subframe of the CC #1 to transmit a P-CQI of the CC #1 by use of PUCCH format 2. Similarly, it uses the 23rd subframe to transmit a P-CQI of the CC #1 by use of PUCCH format 2.

Other than this, there is a difference from the above third example, such that, in the CC #1 of the uplink, each of the first subframe and the 21st subframe are used to transmit the latest plurality of P-CQIs corresponding to the CC #2 to #8.

For the control according to the fourth example, the high capacity PUCCH format and an existing PUCCH format are set in the user terminal. Further, the specific CC and the period and timing for P-CQI reporting for each of the CCs are set from a radio base station by use of RRC or the like. For the specific CC, the user terminal transmits a P-CQI corresponding thereto by use of the existing PUCCH format. Further, the user terminal performs the determination processing described above (determination as to whether to exceed the transmission amount of P-CQIs of eight CCs, which can be transmitted by use of the high capacity PUCCH format) in accordance with the above period and timing. If the transmission amount is exceeded, it ensures resources dividedly by the CC #1 of the PCell and the CC #2 of the SCell, and thereby transmits P-CQIs. Here, the user terminal in the fourth example is preferably formed of a user terminal that can perform UL CA.

According to the fourth example configured as described above, it is possible to adequately report a channel state even where the number of component carriers settable to the user terminal is expanded to six or more. Further, it is possible to cope with such a demand that particularly the radio base station side is desired to timely acquire the CQIs of the user terminal.

Further, a CC important to ensure the connection between the user terminal and the radio base station is treated as a specific CC and is set at a subframe different from a subframe for transmitting P-CQIs of the other CCs. Consequently, it is possible to report only the P-CQI of the specific CC, at one subframe, by use of the existing PUCCH, and thereby to improve the certainty of the reception in the radio base station.

Fifth Example

In the fifth example, if the number of CCs is controlled (or set) to be five or less by CC removal, De-activation, or the like (i.e., if the number of CCs becomes equal to or less than that of CA prescribed by Rel. 12), P-CQIs are transmitted by use of PUCCH format 2, 2a, or 2b for the existing systems (an existing transmission format). Further, if timings of a plurality of CCs overlap with each other, only the P-CQI of a lower cell index CC is kept, and transmission of the P-CQIs of the other CCs is stopped. The fifth example can be applied to any one of the first to fourth examples described above.

Figure 7:
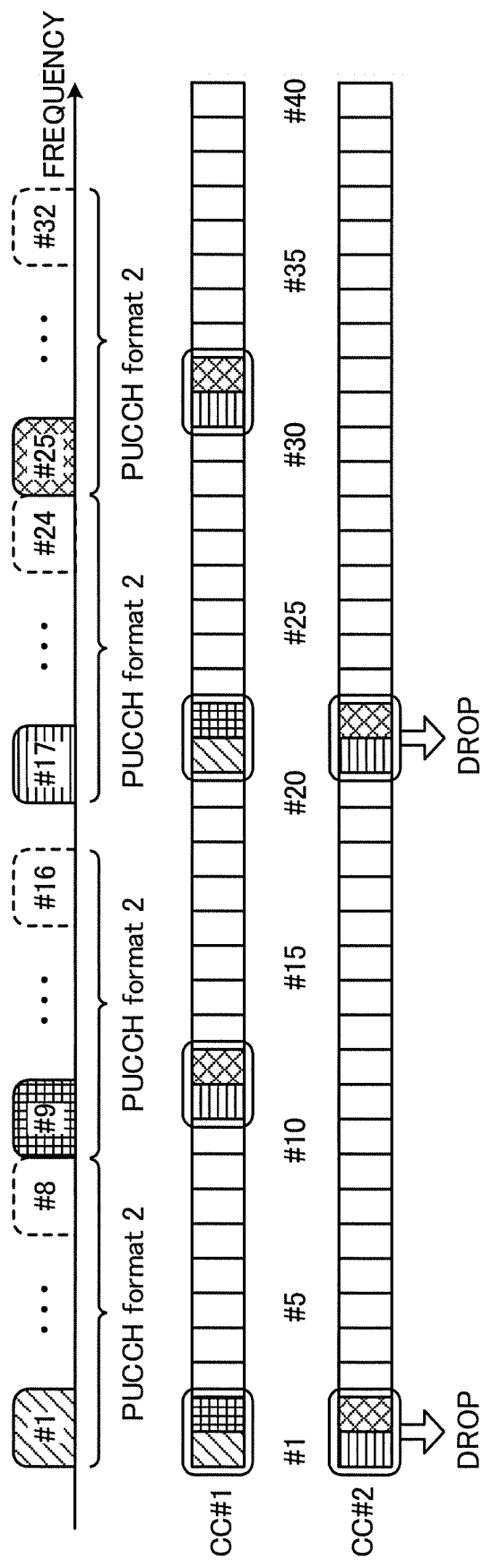
FIG. 7 is a diagram for explaining an example of P-CQI transmission according to a fifth example.

Next, with reference to FIG. 7, a concrete example will be explained. In FIG. 7, there is assumed a case where, in the above third example, CCs are controlled by use of so-called CC removal for RRC, such that the number of CCs is four (CC #1, CC #9, CC #17, and CC #25). Alternatively, there is assumed a case where CCs are controlled by use of so-called CC De-activation, such that the number of CCs to be activated by the MAC control signal (MAC Control Element) is four (CC #1, CC #9, CC #17, and CC #25).

For the control according to the fifth example, the user terminal transmits P-CQI reporting by use of PUCCH format 2 for the existing systems. Further, if P-CQIs are set in different uplink CCs but at the same TTI, the user terminal keeps only the P-CQI of a lower cell index CC, and stops transmission of the P-CQIs of the other CCs.

For example, at the initial TTI illustrated in FIG. 7 (the leftmost TTI), a P-CQI of the CC #1 and a P-CQI of the CC #17 overlap with each other. Accordingly, the user terminal compares their cell indexes, and then transmits the P-CQI of the CC #1 with the lower cell index by use of PUCCH format 2, and stops (or drops) transmission of the P-CQI of the CC #17 with the higher cell index. Similar processing is performed also at the 21st TTI.

Further, at the second TTI, a P-CQI of the CC #9 and a P-CQI of the CC #25 overlap with each other. Accordingly, the user terminal compares their cell indexes, and then transmits the P-CQI of the CC #9 with the lower cell index by use of PUCCH format 2, and stops (or drops) transmission of the P-CQI of the CC #25 with the higher cell index. Similar processing is performed also at the 22nd TTI.

On the other hand, at each of the 11th TTI and the 31st TTI, there is no overlap of P-CQIs, and so a P-CQI of the CC #17 is transmitted by use of PUCCH format 2. Similarly, at each of the 12th TTI and the 32nd TTI, there is no overlap of P-CQIs, and so a P-CQI of the CC #25 is transmitted by use of PUCCH format 2.

Further, if the number of CCs activated exceeds five (i.e., if CCs are activated in a number not prescribed by Rel. 12) because of CC addition or CC activation, P-CQI reporting using the high capacity PUCCH format is applied.

According to the fifth example configured as described above, it is possible to adequately report a channel state even where the number of component carriers settable to the user terminal is expanded to six or more. Further, where the number of component carriers is set to five or less, an existing communication technique is applied, and so it is possible to obtain backward compatibility. Further, where the number of component carriers settable to the user terminal is expanded to six or more, it is possible to cope with such a demand that the radio base station is desired to timely acquire the CQIs of the user terminal.

(Modifications)

In the first to fifth examples described above, some modifications may be considered.

For example, in the high capacity PUCCH format, there may be considered processing for a case where a P-CQI and a scheduling request (SR) overlap with each other. Specifically, if a P-CQI and a scheduling request overlap with each other, the scheduling request is prioritized over the P-CQI, and is transmitted on PUCCH of the PCell. In this case, in the user terminal, control is performed to regard the scheduling request as information higher in priority than the P-CQI. Other than this, if there is a scheduling request, it is transmitted by use of PUCCH format 2, 2a, or 2b (an existing transmission format). In this case, since P-CQIs of a plurality of CCs cannot be transmitted at the same subframe, only transmission of a P-CQI of one CC is performed, based on priority using cell indexes or the like, and transmission of P-CQIs corresponding to the other CCs is stopped.

Other than the above, there may be considered processing for a case where a P-CQI and a SRS (Sounding Reference Signal) overlap with each other on the same CC. In this case, transmission of the SRS may be stopped. Further, in the case of a Periodic SRS (P-SRS) in which the period and/or resource of the SRS are set by use of higher layer signaling, control may be performed to prioritize the P-CQI; and, in the case of an Aperiodic SRS (A-SRS) which is triggered by UL grant, control may be performed to prioritize the A-SRS and to stop transmission of the P-CQI.

Other than the above, there may be considered processing for a case where simultaneous transmission of P-CQIs is performed by a plurality of CCs (transmission at the same TTI) and the user terminal has fallen into a Power-limited state. In this case, one of the following arrangements may be adopted: 1) Power (transmission) for a P-CQI by the PCell is prioritized, and P-CQIs to be transmitted by the SCell are stopped (or dropped) or are subjected to Power-scale. 2) In order to put priority on a scheduling request, power (transmission) for a P-CQI multiplexed by the scheduling request is prioritized, and the other P-CQIs are stopped or are subjected to Power-scale. 3) Based on comparison in the number of CCs multiplexed, power (transmission) for P-CQIs multiplexed in the largest number of CCs is prioritized, and the other P-CQIs are stopped or are subjected to Power-scale.

(Configuration of Radio Communication System)

Next, an explanation will be given of the configuration of a radio communication system according to an embodiment of the present invention. In this radio communication system, any one or combination of the first to fifth examples (including the modifications) is applied.

Figure 8:
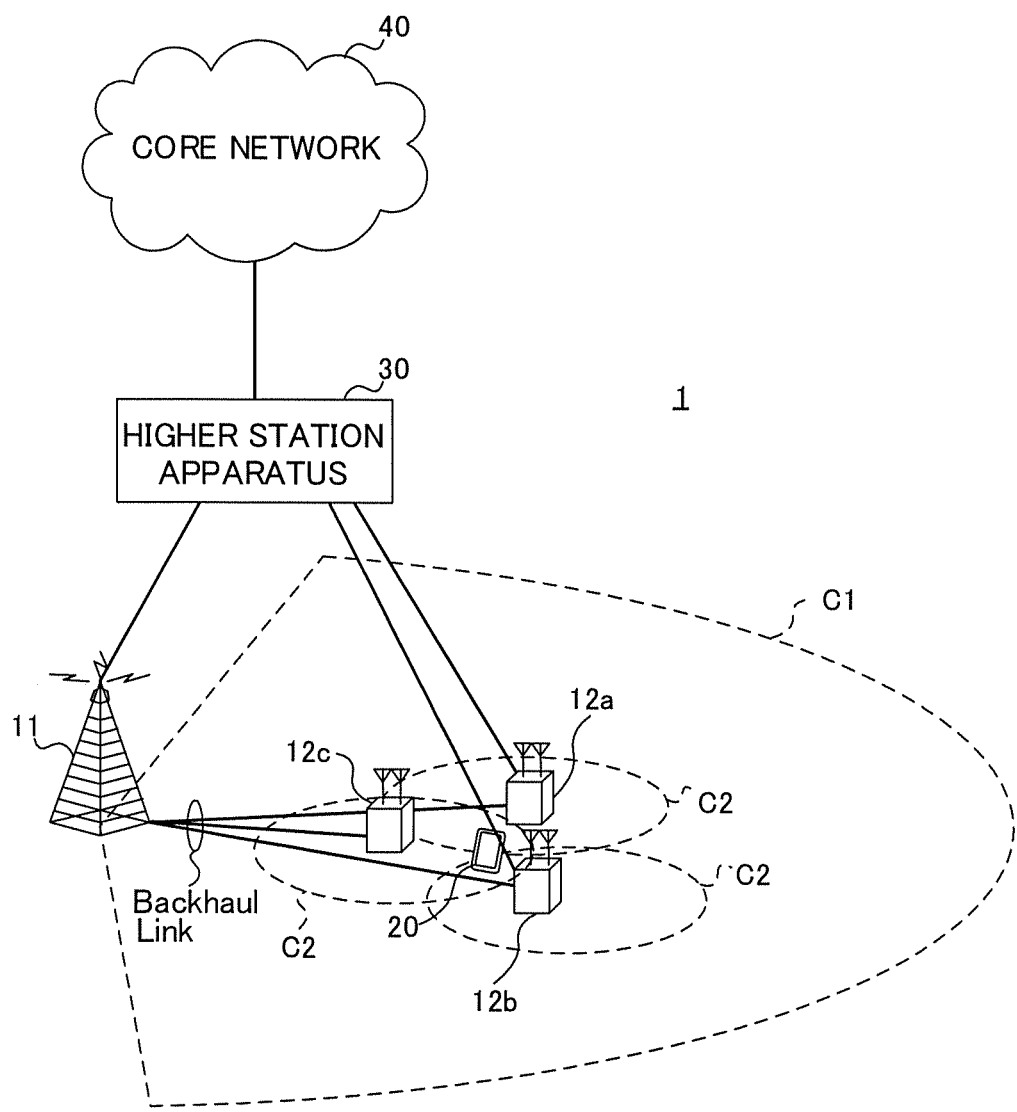
FIG. 8 is a schematic configuration diagram of a radio communication system according to an embodiment of the present invention.

FIG. 8 is a schematic configuration diagram illustrating an example of the radio communication system according to this embodiment of the present invention. As illustrated in FIG. 8, the radio communication system 1 includes a plurality of radio base stations 10 (11 and 12 (12a to 12c)), and a plurality of user terminals 20, which are present within cells formed by the respective radio base stations 10 and are configured to communication with the respective radio base stations 10. The radio base stations 10 are respectively connected to a higher station apparatus 30, and are connected to a core network 40 via the higher station apparatus 30.

In FIG. 8, the radio base station 11 is formed of, e.g., a macro base station having a relatively wide coverage, and provides a macro cell C1. Each of the radio base stations 12 (12a to 12c) is formed of a small base station having a localized coverage, and provides a small cell C2. Here, the number of radio base stations 11 and 12 is not limited to that illustrated in FIG. 8.

The macro cell C1 and the small cells C2 may use the same frequency band, or may use different frequency bands. Further, the radio base stations 11 and 12 are connected to each other via an inter-base station interface (for example, an optical fiber or X2 interface).

Here, the macro base station 11 may be referred to as "radio base station", "eNodeB (eNB)", or "transmission point". The small base stations 12 may be referred to as "pico base station", "femto base station", "Home eNodeB (HeNB)", "transmission point", or "RRH" (Remote Radio Head).

Each of the user terminals 20 is a terminal corresponding to various communication schemes, such as LTE and LTE-A, and may encompass not only a mobile communication terminal but also a stationary communication terminal. Each user terminal 20 can perform communication with the other user terminals 20 via the radio base stations 10.

For example, the higher station apparatus 30 encompasses an access gateway device, radio network controller (RNC), mobility management entity (MME), and the like, but this is not limiting.

In the radio communication system 1, as radio access schemes, OFDMA (orthogonal frequency division multiple connection) is applied to the downlink, and SC-FDMA (single carrier-frequency division multiple connection) is applied to the uplink. OFDMA is a multicarrier transmission scheme for dividing a frequency band into a plurality of narrower frequency bands (subcarriers) and performs communication by mapping data onto the respective subcarriers. SC-FDMA is a single carrier transmission scheme for dividing a system bandwidth into bands formed of one or serial resource blocks for each terminal, and a plurality of terminals respectively use bands different from each other to reduce interference among the terminals. Here, the radio access schemes of the uplink and the downlink are not limited to this combination.

In the radio communication system 1, as the downlink channels, there are used a downlink shared channel (PDSCH: Physical Downlink Shared Channel) shared by the respective user terminals 20, a broadcast channel (PBCH: Physical Broadcast Channel), downlink L1/L2 control channels, and the like. On PDSCH, user data, higher layer control information, and/or predetermined SIB (System Information Block) are transmitted. Further, on PBCH, a synchronous signal, MIB (Master Information Block), and/or the like are transmitted.

The downlink L1/L2 control channels include PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel), and the like. On PDCCH, Downlink Control Information (DCI) including scheduling information relating to PDSCH and PUSCH, and the like, are transmitted. On PCFICH, an OFDM symbol number used for PDCCH is transmitted. On PHICH, an HARQ delivery acknowledgement signal (ACK/NACK) with respect to PUSCH is transmitted. EPDCCH may be treated together with PDSCH (downlink shared data channel) by frequency division multiple, and used to transmit the DCI or the like similarly to PDCCH.

In the radio communication system 1, as the uplink channels, there are used an uplink shared channel (PUSCH: Physical Uplink Shared Channel) shared by the respective user terminals 20, an uplink control channel (PUCCH: Physical Uplink Control Channel), a random access channel (PRACH: Physical Random Access Channel), and the like. On PUSCH, user data and/or higher layer control information are transmitted. Further, on PUCCH, downlink radio quality information (CQI: Channel Quality Indicator), delivery acknowledgement signal, and/or the like are transmitted. On PRACH, a random access preamble (RA preamble) for establishing connection to a cell is transmitted. Further, as uplink reference signals, there are transmitted a reference signal for measuring the channel quality (SRS: Sounding Reference Signal), and a demodulation reference signal (DM-RS: Demodulation Reference Signal) for demodulating PUCCH and/or PUSCH.

Figure 9:
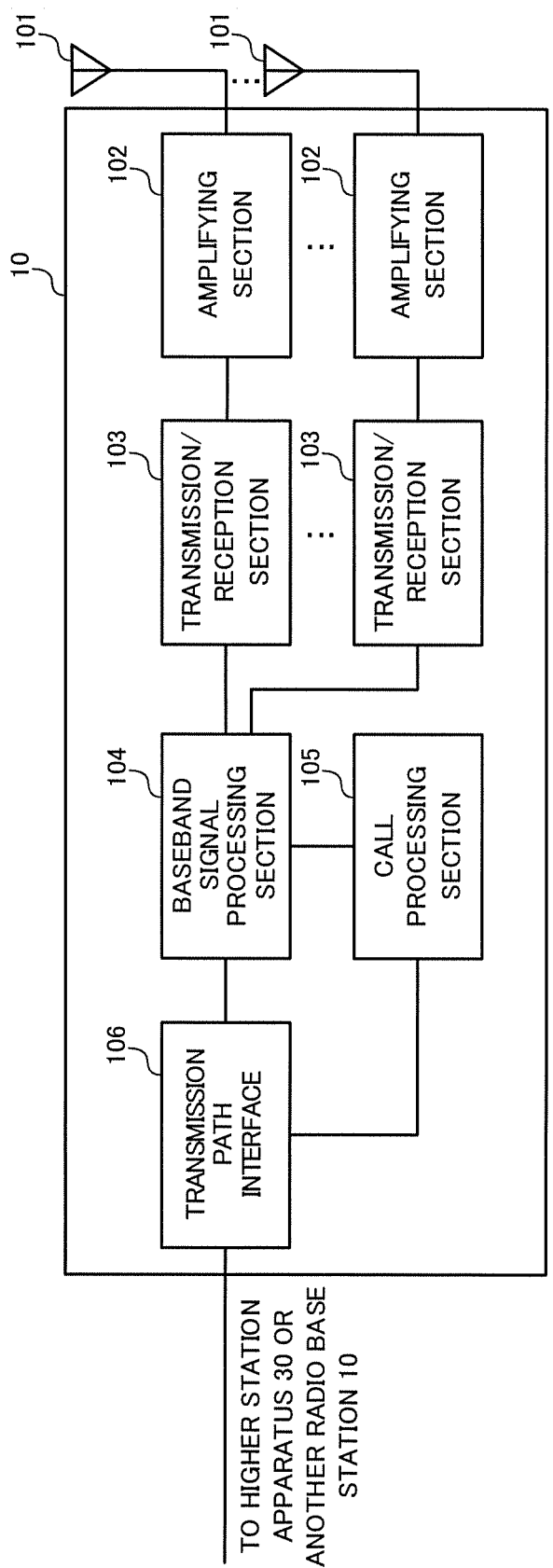
FIG. 9 is a diagram illustrating an example of the entire configuration of a radio base station according to the embodiment of the present invention.

FIG. 9 is a diagram illustrating an example of the entire configuration of each of the radio base stations 10 according to this embodiment. Each radio base station 10 (encompassing the radio base stations 11 and 12) includes a plurality of transmission/reception antennas 101 for MIMO transmission, amplifying sections 102, transmission/reception sections 103, a baseband signal processing section 104, a call processing section 105, and a transmission path interface 106. Here, each transmission/reception section 103 is formed of a transmission section and a reception section.

User data to be transmitted from each radio base station 10 to a user terminal 20 by the downlink is input from the higher station apparatus 30 through the transmission path interface 106 to the baseband signal processing section 104.

In the baseband signal processing section 104, the user data is subjected to transmission processing, such as: PDCP (Packet Data Convergence Protocol) layer processing; division and join of the user data; RLC layer transmission processing, such as RLC (Radio Link Control) retransmission control; MAC (Medium Access Control) retransmission control (for example, HARQ (Hybrid Automatic Repeat reQuest) transmission processing); scheduling; transmission format selection; channel coding; Inverse Fast Fourier Transform (IFFT) processing; pre-coding processing; and/or the like. Then, the user data is transferred to each transmission/reception section 103. Further, also a downlink control signal is subjected to transmission processing, such as channel coding and/or inverse fast Fourier transform, and is transferred to each transmission/reception section 103.

Each transmission/reception section 103 converts a downlink signal, which has been output from the baseband signal processing section 104 in a pre-coded state for each antenna, into a signal of a radio frequency band, and transmits it. The radio frequency signal converted in frequency by each transmission/reception section 103 is amplified by the corresponding amplifying section 102 and transmitted from the corresponding transmission/reception antenna 101. Each transmission/reception section 103 may be formed of a transmitter/receiver, transmission/reception circuit, or transmission/reception device, utilized in the technical field of the present invention.

On the other hand, as regards uplink signals, a radio frequency signal received by each transmission/reception antenna 101 is amplified by the corresponding amplifying section 102. Each transmission/reception section 103 receives the uplink signal amplified by the corresponding amplifying section 102. Each transmission/reception section 103 converts in frequency the reception signal into a baseband signal, and outputs it to the baseband signal processing section 104.

In the baseband signal processing section 104, user data contained in the input uplink signal is subjected to: Fast Fourier Transform (FFT) processing; Inverse Discrete Fourier Transform (IDFT) processing; error correction decoding; MAC retransmission control reception processing; and/or RLC layer and PDCP layer reception processing. Then, the user data is transferred via the transmission path interface 106 to the higher station apparatus 30. The call processing section 105 performs: call processing, such as setting or releasing of a communication channel; state management of the radio base stations 10; and/or radio resource management.

The transmission path interface 106 transmits and receives a signal with respect to the higher station apparatus 30 via a predetermined interface. Further, the transmission path interface 106 may transmit and receive (backhaul signaling) a signal with respect to an adjacent radio base station via an inter-base station interface (for example, an optical fiber or X2 interface).

Figure 10:
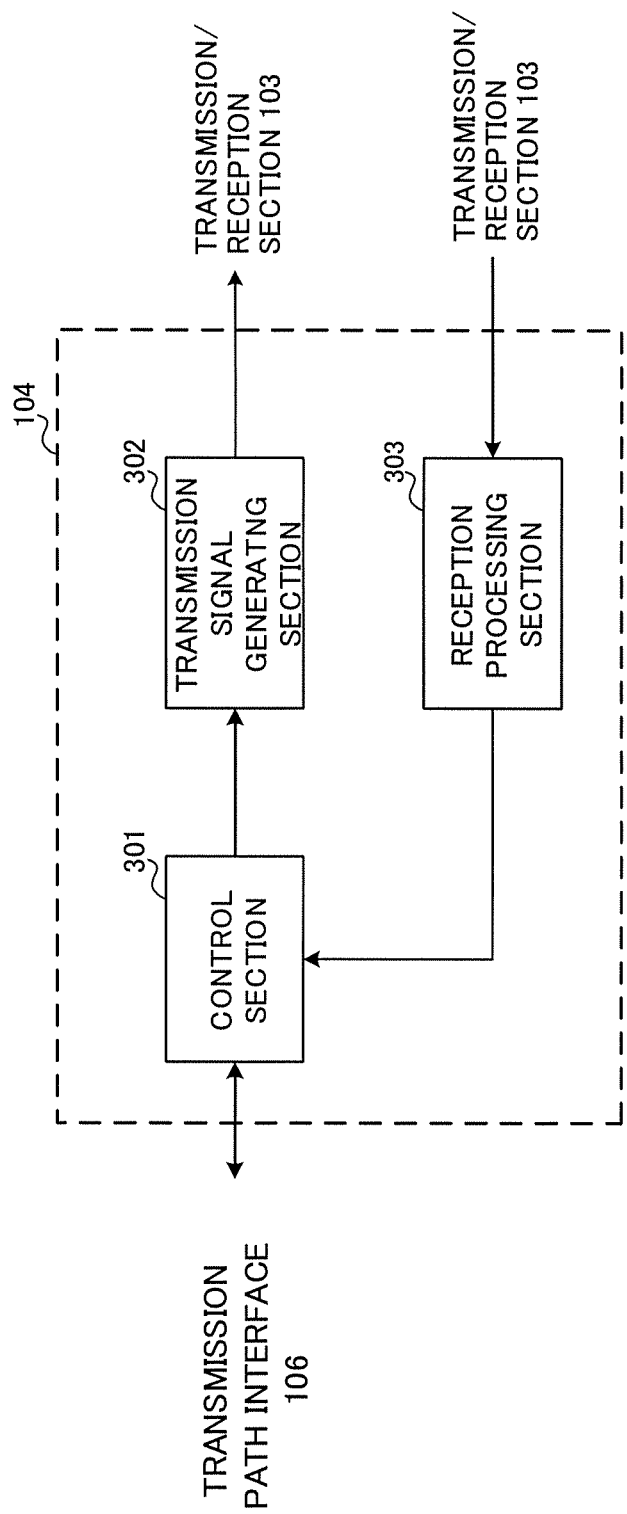
FIG. 10 is a diagram illustrating an example of a functional configuration of the radio base station according to the embodiment of the present invention.

FIG. 10 is a principal function configuration diagram of the baseband signal processing section 104 included in each of the radio base stations 10 according to this embodiment. Here, in FIG. 10, the functional block of a characterizing part according to this embodiment is mainly shown, but each radio base station 10 is supposed to include other functional blocks necessary for radio communication.

As illustrated in FIG. 10, each radio base station 10 is configured by including at least a control section (scheduler) 301, a transmission signal generating section 302, and a reception processing section 303.

The control section (scheduler) 301 controls scheduling of a downlink data signal to be transmitted on PDSCH and a downlink control signal to be transmitted on PDCCH and/or expanded PDCCH (EPDCCH). Further, the control section 301 performs control of scheduling of system information, synchronization signal, downlink control signals, such as CRS, CSI-RS, and the like. Further, the control section 301 performs control of scheduling of an uplink reference signal, an uplink data signal to be transmitted on PUSCH, and an uplink control signal to be transmitted on PUCCH and/or PUSCH. Here, the control section 301 may be formed of a controller, control circuit, or control device, utilized in the technical field of the present invention.

Further, the control section 301 can control the transmission signal generating section 302, to control CCs treated as measurement targets in a user terminal 20 connected in this radio base station 10. Specifically, the control section 301 notifies the transmission signal generating section 302 of CC information contained in a TAG, and controls it to generate a signal containing this CC information (for example, higher layer signaling), (the first example). Further, the control section 301 notifies the transmission signal generating section 302 of a measurement gap configuration set in each TAG, and controls it to generate a signal containing this measurement gap configuration (for example, higher layer signaling), (the second example).

Based on an instruction from the control section 301, the transmission signal generating section 302 generates a DL signal (a downlink control signal, downlink data signal, downlink reference signal, or the like). For example, based on CC information contained in a timing advance group (TAG) sent from the control section 301, the transmission signal generating section 302 generates a signal containing this CC information (the first or second example). In this case, the transmission signal generating section 302 may generate a signal containing a CC list in the TAG (the first or second example). Further, based on a measurement gap configuration set in each TAG sent from the control section 301, the transmission signal generating section 302 generates a signal containing this measurement gap configuration (the second example). The information of these kinds is sent from each transmission/reception section 103 to a user terminal 20 by use of higher layer signaling (for example, RRC signaling or a broadcast signal) or a downlink control signal. Here, the transmission signal generating section 302 may be formed of a signal generator or signal generating circuit, utilized in the technical field of the present invention.

The reception processing section 303 performs reception processing (for example, demapping, demodulation, decoding, and/or the like) to a UL signal (such as an uplink control signal, uplink data signal, or uplink reference signal) transmitted from a user terminal 20. For example, the reception processing section 303 performs reception processing (such as measurement of reception power (RSRP) or channel state) to a measurement result transmitted from a user terminal 20. More specifically, the reception processing section 303 performs reception processing to a measurement result for each TAG transmitted from a user terminal 20 (the first example). Further, the reception processing section 303 performs reception processing to a measurement result for each CC transmitted from a user terminal 20 (the second example). Then, the reception processing section 303 outputs a measurement result subjected to reception processing to the control section 301. Here, the reception processing section 303 may be formed of a signal processor or signal processing circuit, utilized in the technical field of the present invention.

Figure 11:
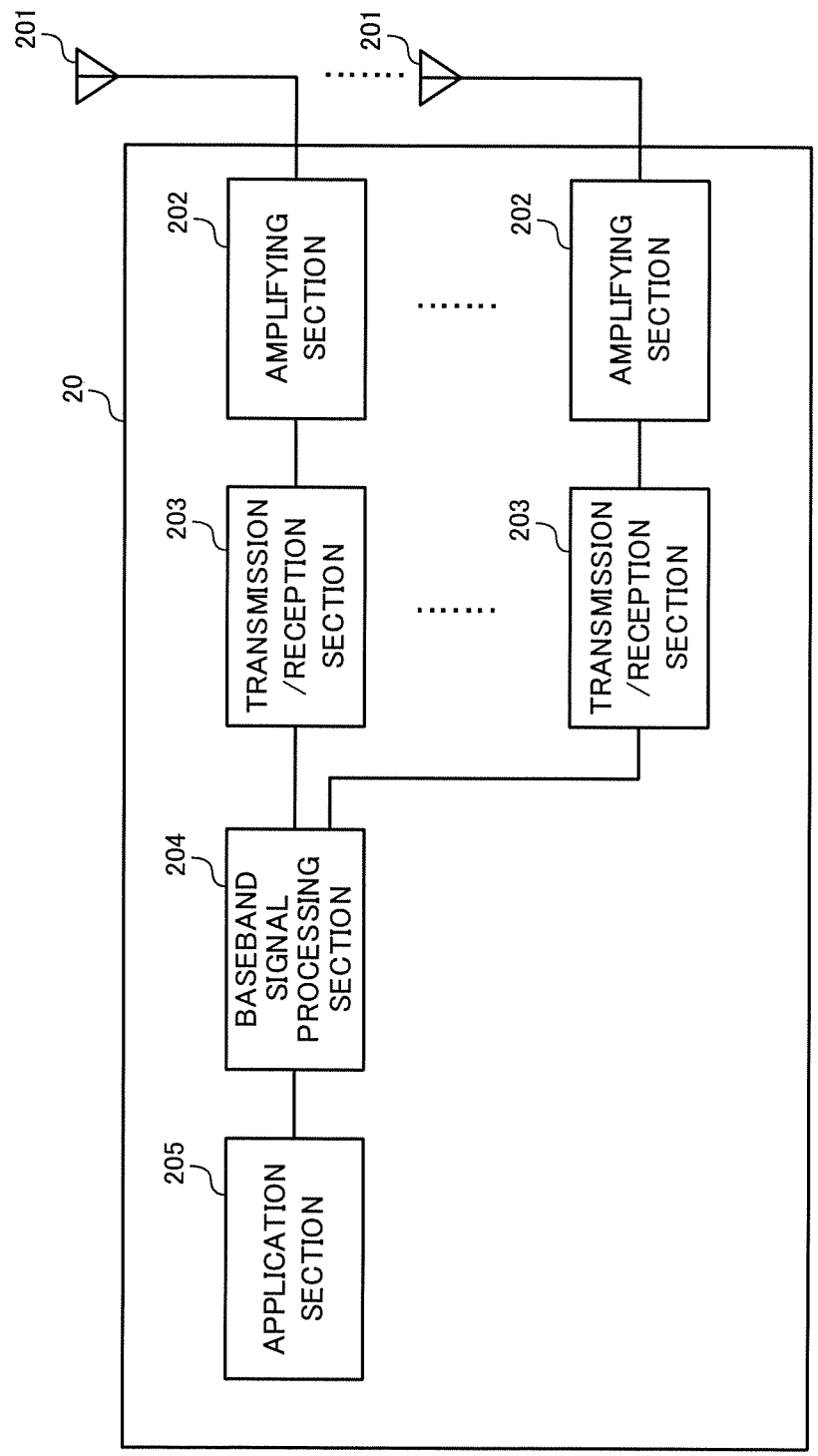
FIG. 11 is a diagram illustrating an example of the entire configuration of a user terminal according to the embodiment of the present invention.

FIG. 11 is a diagram illustrating an example of the entire configuration of each of the user terminals 20 according to the embodiment of the present invention. As illustrated in FIG. 11, each user terminal 20 includes a plurality of transmission/reception antennas 201 for MIMO transmission, amplifying sections 202, transmission/reception sections 203, a baseband signal processing section 204, and an application section 205. Here, each transmission/reception section 203 may be formed of a transmission section and a reception section.

Radio frequency signals respectively received by the plurality of transmission/reception antennas 201 are amplified by the amplifying sections 202. Each transmission/reception section 203 receives a downlink signal amplified by the corresponding amplifying section 202. Each transmission/reception section 203 converts in frequency the reception signal into a baseband signal, and outputs it to the baseband signal processing section 204. Each transmission/reception section 203 may be formed of a transmitter/receiver, transmission/reception circuit, or transmission/reception device, utilized in the technical field of the present invention.

The baseband signal processing section 204 performs reception processing, such as FFT processing, error correction decoding, and/or retransmission control to the input baseband signal. User data on the downlink is transferred to the application section 205. The application section 205 performs processing and the like concerning layers higher than the physical layer and MAC layer. Further, of the downlink data, broadcast information is also transferred to the application section 205.

On the other hand, uplink user data is input from the application section 205 to the baseband signal processing section 204. In the baseband signal processing section 204, the user data is subjected to: retransmission control transmission processing (for example, HARQ transmission processing); channel coding; pre-coding; Discrete Fourier Transform (DFT) processing; IFFT processing; and/or the like. Then, the user data is transferred to each transmission/reception section 203. Each transmission/reception section 203 converts a baseband signal, which has been output from the baseband signal processing section 204, into a signal of a radio frequency band, and transmits it. The radio frequency signal converted in frequency by each the transmission/reception sections 203 is amplified by the corresponding amplifying section 202 and transmitted from the corresponding transmission/reception antenna 201.

Each transmission/reception section 203 can transmit and receive a signal with respect to a radio base station that sets a TAG composed of one or more cells. Further, each transmission/reception section 203 can transmit and receive signals with respect to a plurality of radio base stations that respectively sets cell groups (CG) composed of one or more cells.

Figure 12:
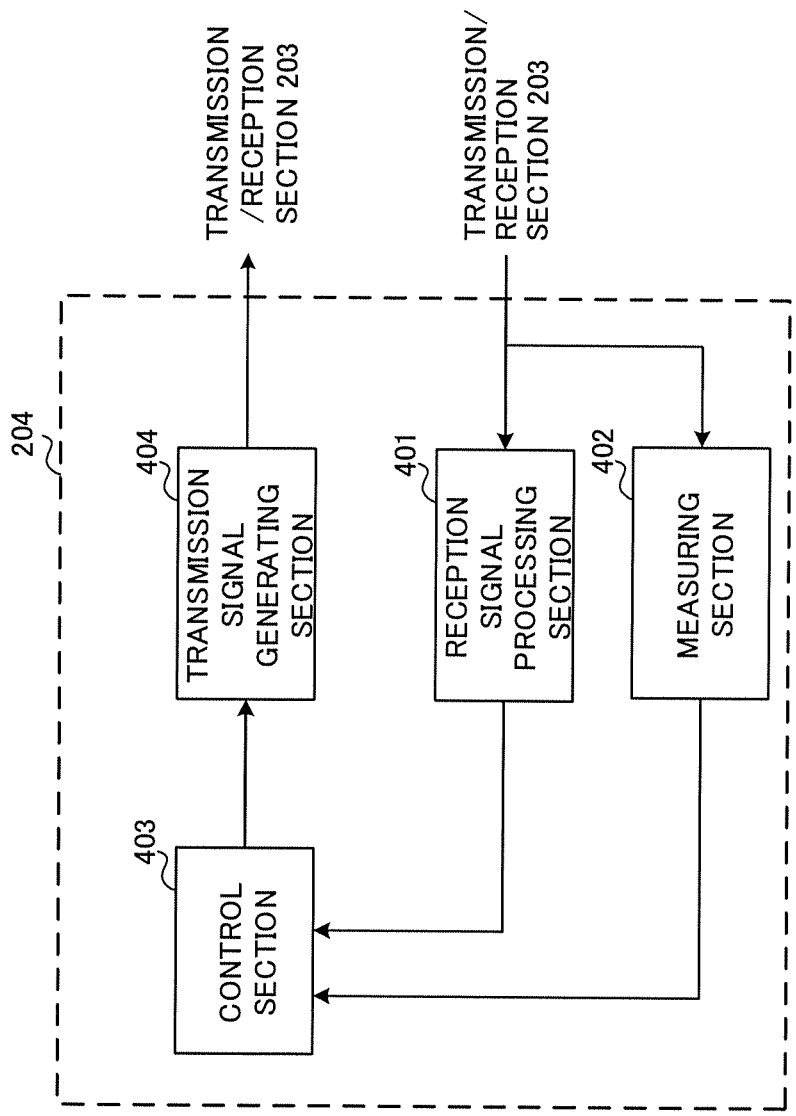
FIG. 12 is a diagram illustrating an example of a functional configuration of the user terminal according to the embodiment of the present invention.

FIG. 12 is a principal function configuration diagram of the baseband signal processing section 204 included in each of the user terminals 20. Here, in FIG. 12, the functional block of a characterizing part according to this embodiment is mainly shown, but each user terminal 20 is supposed to include other functional blocks necessary for radio communication.

As illustrated in FIG. 12, each user terminal 20 is configured by including at least a reception signal processing section 401, a measuring section 402, a control section 403, and a transmission signal generating section 404.

The reception signal processing section 401 performs reception processing (for example, demapping, demodulation, decoding, and/or the like) to a DL signal (for example, a downlink control signal transmitted from a radio base station, downlink data signal transmitted on PDSCH, and/or the like). The reception signal processing section 401 outputs information, which has been received from a radio base station 10, to the control section 403. For example, the reception signal processing section 401 outputs broadcast information, system information, paging information, RRC signaling, and/or DCI to the control section 403.

The reception signal processing section 401 may be formed of a signal processor, signal processing circuit, or signal processing device, and a measuring instrument, measuring circuit, or measuring device, which are explained based on the common view in the technical field of the present invention.

The measuring section 402 measures reception power (RSRP), reception quality (RSRQ), and/or channel state by use of a reception signal, and outputs this result to the control section 403. Particularly, in this embodiment, the above measurement is performed to each of the CCs of CA.

The control section 403 generates P-CQIs, based on measurement results obtained by the measuring section 402 and various kinds of information (the period, timing, CCs, and specific CC for P-CQI reporting) sent from a radio base station 10 via the reception signal processing section 401. Further, the control section 403 instructs the transmission signal generating section 404 as to how to allocate the P-CQIs to uplink resources.

According to the first example described above, the high capacity PUCCH is set in the user terminal 20, and the control section 403 instructs the transmission signal generating section 404 to transmit P-CQIs of at most eight CCs, at the same subframe (the same TTI), by use of the high capacity PUCCH format, in accordance with the period and timing.

According to the second example described above, the control section 403 instructs the transmission signal generating section 404 to transmit P-CQIs of at most eight CCs, at the same subframe, by use of the high capacity PUCCH format, in accordance with the period, timing, and CC.

According to the third example described above, determination processing is performed (determination as to whether to exceed the transmission amount of P-CQIs of eight CCs, which can be transmitted by use of the high capacity PUCCH format) in accordance with the period and timing. If the transmission amount is exceeded, the control section 403 instructs the transmission signal generating section 404 to ensure resources dividedly by the CC #1 of the PCell and the CC #2 of the SCell, and thereby transmit P-CQIs.

According to the fourth example described above, as regards only a specific CC, the control section 403 instructs the transmission signal generating section 404 to transmit the P-CQI of the specific CC by use of an existing PUCCH format (for example, PUCCH format 2). Further, as regards the P-CQIs of the other CCs, the determination processing is performed (determination as to whether to exceed the transmission amount of P-CQIs of eight CCs, which can be transmitted by use of the high capacity PUCCH format). If the transmission amount is exceeded, the control section 403 instructs the transmission signal generating section 404 to ensure resources dividedly by the CC #1 of the PCell and the CC #2 of the SCell, and thereby transmit P-CQIs.

According to the fifth example described above, if the number of CCs is set to be five or less by CC removal, De-activation, or the like, the control section 403 instructs the transmission signal generating section 404 to transmit P-CQI reporting by use of PUCCH format 2 for the existing systems. At this time, even among different CCs, if P-CQIs overlap with each other at the same TTI, the control section 403 instructs the transmission signal generating section 404 to transmit only the P-CQI of a lower cell index CC, while stopping transmission of the P-CQIs of the other CCs.

The control section 403 may be formed of a controller, control circuit, or control device, which is explained based on the common view in the technical field of the present invention.

Based on an instruction from the control section 403, the transmission signal generating section 404 generates a UL signal, performs mapping processing thereto, and outputs it to the transmission/reception sections 203. Based on an instruction from the control section 403, the transmission signal generating section 404 generates an uplink control signal, such as a delivery acknowledgement signal (HARQ-ACK), channel state information (CSI), or the like. Further, based on an instruction from the control section 403, the transmission signal generating section 404 generates an uplink data signal. For example, if UL grant is contained in a downlink control signal sent from a radio base station 10, the transmission signal generating section 404 is instructed by the control section 403 to generate an uplink data signal.

It should be noted that block diagrams used for the description of the above embodiment show functional unit blocks. Each of these functional blocks (configuration sections) is realized by an arbitrary combination of hardware and software. Further, means for realizing each functional block is not limited to a specific one. In other words, each functional block may be realized by a single device physically integrated, or may be realized by a plurality of devices in which two or more devices physically separated are connected by cable or radio.

For example, some or all of the respective functions of each of the radio base stations 10 and the user terminals 20 may be realized by use of hardware, such as an ASIC (Application Specific Integrated Circuit), PLD (Programmable Logic Device), and/or FPGA (Field Programmable Gate Array). Further, each of the radio base stations 10 and the user terminals 20 may be realized by a computer apparatus including a processor (CPU), a communication interface for network connection, a memory, and a computer readable storage medium that holds programs.

Here, the processor, the memory, and so forth are connected to each other by a bus for communicating information. Further, the computer readable storage medium is a storage medium, such as a flexible disk, magneto-optical disk, ROM, EPROM, CD-ROM, RAM, or hard disk, for example. Further, the program may be transmitted from a network via an electric communication line. Further, each of the radio base stations 10 and the user terminals 20 may include an input device, such as input keys, and/or an output device, such as a display.

A functional configuration of each of the radio base stations 10 and the user terminals 20 may be realized by the hardware described above, may be realized by a software module to be executed by a processor, or may be realized by a combination of both of them. The processor operates an operating system to control the entirety of the corresponding user terminal. Further, the processor reads a program, software module, or data from the storage medium into the memory, and performs processing of various kinds in accordance with the read program or the like. Here, the program only needs to be a program that causes a computer to perform the respective operations described in the embodiment. For example, the control section 301 of each radio base station 10 may be realized by a control program that is stored in the memory and is operated by the processor, and the other functional blocks may also be realized similarly.

Although the present invention has been described in detail above, it will be obvious to those skilled in the art that the present invention is not limited to the embodiment described in the specification. For example, the respective aspects described above may be used each alone, or may be used in combination. The present invention can be implemented as modified and altered aspects without departing from the sprit and scope of the present invention as defined by the scope of the Claims. Accordingly, the description of the specification is for the purpose of illustrative explanation, and does not have any restrictive meaning to the present invention.

The invention claimed is:

1. A terminal comprising:
   a receiver that receives a downlink signal from a base station using carrier aggregation, in which six or more component carriers can be configured, and receives the downlink signal using multiple component carriers among the six or more component carriers;
   a transmitter that periodically transmits multiple channel state information using a predetermined transmission time unit length; and
   a processor that controls transmission of the multiple channel state information by configuring, per component carrier, based on a notification from a higher layer,
   a transmission period of the multiple channel state information, and
   a timing of the multiple channel state information,
   wherein when transmitting the multiple channel state information,
   the processor controls the transmission of the multiple channel state information by configuring the transmission period and the timing per component carrier, and
   the processor controls the transmission of the multiple channel state information in a Physical Uplink Control Channel (PUCCH) format having a larger capacity than a PUCCH format 3 in Long Term Evolution (LTE), and
   wherein a spreading factor of the PUCCH format is smaller than a spreading factor of the PUCCH format 3 in LTE.

2. The terminal according to claim 1, wherein the processor controls the transmission of the multiple channel state information in a resource based on a notification from a higher layer.

3. The terminal according to claim 1, wherein, when the processor transmits channel station information for at least one component carrier of the multiple component carriers, the processor controls transmission of the channel state information for the at least one component carrier of the multiple component carriers on a PUCCH of a predetermined component carrier.

4. A radio communication method, for a terminal, comprising:
- receiving a downlink signal from a base station using carrier aggregation, in which six or more component carriers can be configured, and receiving the downlink signal using multiple component carriers among the six or more component carriers;
- periodically transmitting multiple channel state information using a predetermined transmission time unit length; and
- controlling transmission of the multiple channel state information by configuring, per component carrier, based on a notification from a higher layer,
- a transmission period of the multiple channel state information, and
- a timing of the multiple channel state information,
- wherein when transmitting the multiple channel state information,
- the terminal controls the transmission of the multiple channel state information by configuring the transmission period and the timing per component carrier, and
- the terminal controls the transmission of the multiple channel state information in a Physical Uplink Control Channel (PUCCH) format having a larger capacity than a PUCCH format 3 in Long Term Evolution (LTE), and
- wherein a spreading factor of the PUCCH format is smaller than a spreading factor of the PUCCH format 3 in LTE.

* * * * *